US011472301B2

(12) United States Patent
Singh et al.

(10) Patent No.: US 11,472,301 B2
(45) Date of Patent: Oct. 18, 2022

(54) METHOD AND SYSTEM FOR TEMPERATURE REGULATION FOR A PORTABLE CHARGER

(71) Applicant: Webasto Charging Systems, Inc., Monrovia, CA (US)

(72) Inventors: Varundeep Singh, Monrovia, CA (US); Peter Gabrielsson, Monrovia, CA (US)

(73) Assignee: WEBASTO CHARGING SYSTEMS, INC., Monrovia, CA (US)

( * ) Notice: Subject to any disclaimer, the term of this patent is extended or adjusted under 35 U.S.C. 154(b) by 165 days.

(21) Appl. No.: 16/989,419

(22) Filed: Aug. 10, 2020

(65) Prior Publication Data
US 2022/0045542 A1 Feb. 10, 2022

(51) Int. Cl.
*H02J 7/00* (2006.01)
*B60L 53/16* (2019.01)
*B60L 53/60* (2019.01)
*G01K 1/02* (2021.01)
*H01R 13/66* (2006.01)

(52) U.S. Cl.
CPC ............. *B60L 53/16* (2019.02); *B60L 53/60* (2019.02); *G01K 1/026* (2013.01); *H02J 7/00032* (2020.01); *H02J 7/0045* (2013.01); *H01R 13/6683* (2013.01); *H02J 7/0029* (2013.01); *H02J 7/00304* (2020.01); *H02J 7/00309* (2020.01); *H02J 7/007192* (2020.01)

(58) Field of Classification Search
CPC ...... B60L 53/16; B60L 53/60; B60L 2240/36; G01K 1/026; H02J 7/00032; H02J 7/0045; H02J 7/007192

USPC ............................................. 320/109; 701/22
See application file for complete search history.

(56) References Cited

U.S. PATENT DOCUMENTS

2015/0171646 A1* 6/2015 Pham ........................ B60L 3/00
320/109
2016/0039297 A1* 2/2016 Kretschmer ........... G01K 13/00
439/620.21
(Continued)

FOREIGN PATENT DOCUMENTS

WO 2013132874 A1 9/2013
WO 2017014643 A1 1/2017
(Continued)

OTHER PUBLICATIONS

International Search Report and Written Opinion for PCT/US21/44830, dated Dec. 14, 2021.

*Primary Examiner* — Zixuan Zhou
(74) *Attorney, Agent, or Firm* — Concept IP LLP; Michael Zarrabian

(57) ABSTRACT

Systems, devices, and methods including a first pair of redundant temperature sensors proximate a first plug; a second pair of redundant temperature sensors proximate a second plug; a first microcontroller connected to a plugsense line and a ground line, where the first microcontroller may be configured to receive temperature data from the first pair of redundant temperature sensors and the second pair of redundant temperature sensors; and a first switch configured to receive a data packet comprising temperature data from the first pair of redundant temperature sensors and the second pair of redundant temperature sensors, where the first switch transmits the data packet by lowering voltage in the plugsense line.

20 Claims, 13 Drawing Sheets

(56) References Cited

U.S. PATENT DOCUMENTS

| | | | |
|---|---|---|---|
| 2016/0137079 A1* | 5/2016 | Jefferies | H02H 5/04 |
| | | | 320/109 |
| 2017/0334300 A1* | 11/2017 | Huang | H02J 7/0029 |
| 2018/0229615 A1* | 8/2018 | Shumaker | H01R 13/6683 |
| 2019/0376299 A1* | 12/2019 | Field | E04F 19/028 |
| 2020/0079235 A1 | 3/2020 | Moseke | |
| 2020/0180449 A1* | 6/2020 | Lo | H02J 7/007192 |

FOREIGN PATENT DOCUMENTS

| | | |
|---|---|---|
| WO | 2018105809 A1 | 6/2018 |
| WO | WO-2018105809 A1 * | 6/2018 |

\* cited by examiner

METHOD AND SYSTEM FOR TEMPERATURE REGULATION FOR A PORTABLE CHARGER

TECHNICAL FIELD

Embodiments relate generally to portable chargers, and more particularly to temperature regulation for an AC plug.

BACKGROUND

Electric vehicle supply equipment (EVSE) may be used to charge electric vehicles (EV) and may utilize standard AC utility power taken from a standard utility socket in the home or at other locations to draw power. An EVSE may include an EVSE case enclosing a power supply, controller and relays (not shown) to accept utility power provided from a receptacle plug assembly and a power cord for selective communication of the power to a J1772 compliant connector.

SUMMARY

A system embodiment may include: a first pair of redundant temperature sensors proximate a first plug; a second pair of redundant temperature sensors proximate a second plug; a first microcontroller connected to a plugsense line and a ground line, where the first microcontroller may be configured to receive temperature data from the first pair of redundant temperature sensors and the second pair of redundant temperature sensors; and a first switch configured to receive a data packet comprising temperature data from the first pair of redundant temperature sensors and the second pair of redundant temperature sensors, where the first switch transmits the data packet by lowering voltage in the plugsense line.

In additional system embodiments, a second microcontroller may be configured to generate a status signal. In additional system embodiments, a second switch may be configured to receive the status signal from the second microcontroller. In additional system embodiments, a first comparator may be connected to the plugsense line, where the first comparator may be configured to detect the status signal from the second switch as the voltage in the plugsense line may be lowered.

In additional system embodiments, the first comparator may be further configured to transmit the signal to the first microcontroller. In additional system embodiments, a second comparator may be connected to the plugsense line, where the second comparator may be configured to detect the data packet from the first switch as the voltage in the plugsense line may be lowered.

In additional system embodiments, the second comparator may be further configured to transmit the signal to the second microcontroller. In additional system embodiments, the second microcontroller may be further configured to determine if any temperature sensor of the first pair of redundant temperature sensors and the second pair of redundant temperature sensors may be stuck or open. In additional system embodiments, the second microcontroller may be further configured to reduce a charging current if the temperature in the data packet exceeds a threshold.

Additional system embodiments may further include: a gridcord and a charge circuit interrupting device (CCID), where the first pair of redundant temperature sensors, the second pair of redundant temperature sensors, the first microcontroller, the first switch, and the first comparator may be disposed in the gridcord, and where the second switch and the second comparator may be disposed in the CCID.

A method embodiment may include: receiving, by a first microcontroller connected to a plugsense line and a ground line, temperature data from a first pair of redundant temperature sensors and a second pair of redundant temperature sensors, where the first pair of redundant temperature sensors may be proximate a first plug, and where the second pair of redundant temperature sensors proximate a second plug; transmitting, by the first microcontroller a data packet comprising temperature data from the first pair of redundant temperature sensors and the second pair of redundant temperature sensors to a first switch; and transmitting, by the first switch the received data packet by lowering voltage in the plugsense line.

Additional method embodiments may include generating, by a second microcontroller, a status signal. Additional method embodiments may include receiving, by a second switch, the generated status signal from the second microcontroller. Additional method embodiments may include detecting, by a first comparator connected to the plugsense line, the status signal from the second switch as the voltage in the plugsense line may be lowered.

Additional method embodiments may include transmitting, by the first comparator, the detected signal to the first microcontroller. Additional method embodiments may include detecting, by a second comparator connected to the plugsense line, the data packet from the first switch as the voltage in the plugsense line may be lowered.

Additional method embodiments may include transmitting, by the second comparator, the detected signal to the second microcontroller. Additional method embodiments may include determining, by the second microcontroller, if any temperature sensor of the first pair of redundant temperature sensors and the second pair of redundant temperature sensors may be stuck or open. Additional method embodiments may include reducing, by the second microcontroller, a charging current if the temperature in the data packet exceeds a threshold.

Another system embodiment may include: a first pair of redundant temperature sensors proximate a first plug; a second pair of redundant temperature sensors proximate a second plug; a first microcontroller connected to a plugsense line and a ground line, where the first microcontroller may be configured to receive temperature data from the first pair of redundant temperature sensors and the second pair of redundant temperature sensors; a first switch configured to receive a data packet comprising temperature data from the first pair of redundant temperature sensors and the second pair of redundant temperature sensors, where the first switch transmits the data packet by lowering voltage in the plugsense line; a second microcontroller configured to generate a status signal; a second switch configured to receive the status signal from the second microcontroller; a first comparator connected to the plugsense line, where the first comparator may be configured to detect the status signal from the second switch as the voltage in the plugsense line may be lowered, where the first comparator may be further configured to transmit the signal to the first microcontroller; a second comparator connected to the plugsense line, where the second comparator may be configured to detect the data packet from the first switch as the voltage in the plugsense line may be lowered, where the second comparator may be further configured to transmit the signal to the second microcontroller, where the second microcontroller may be further configured to determine if any temperature sensor of the first pair of redundant temperature sensors and the second pair of redundant temperature sensors may be stuck or open, where the second microcontroller may be further configured to reduce a charging current if the temperature in the data packet exceeds a threshold.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
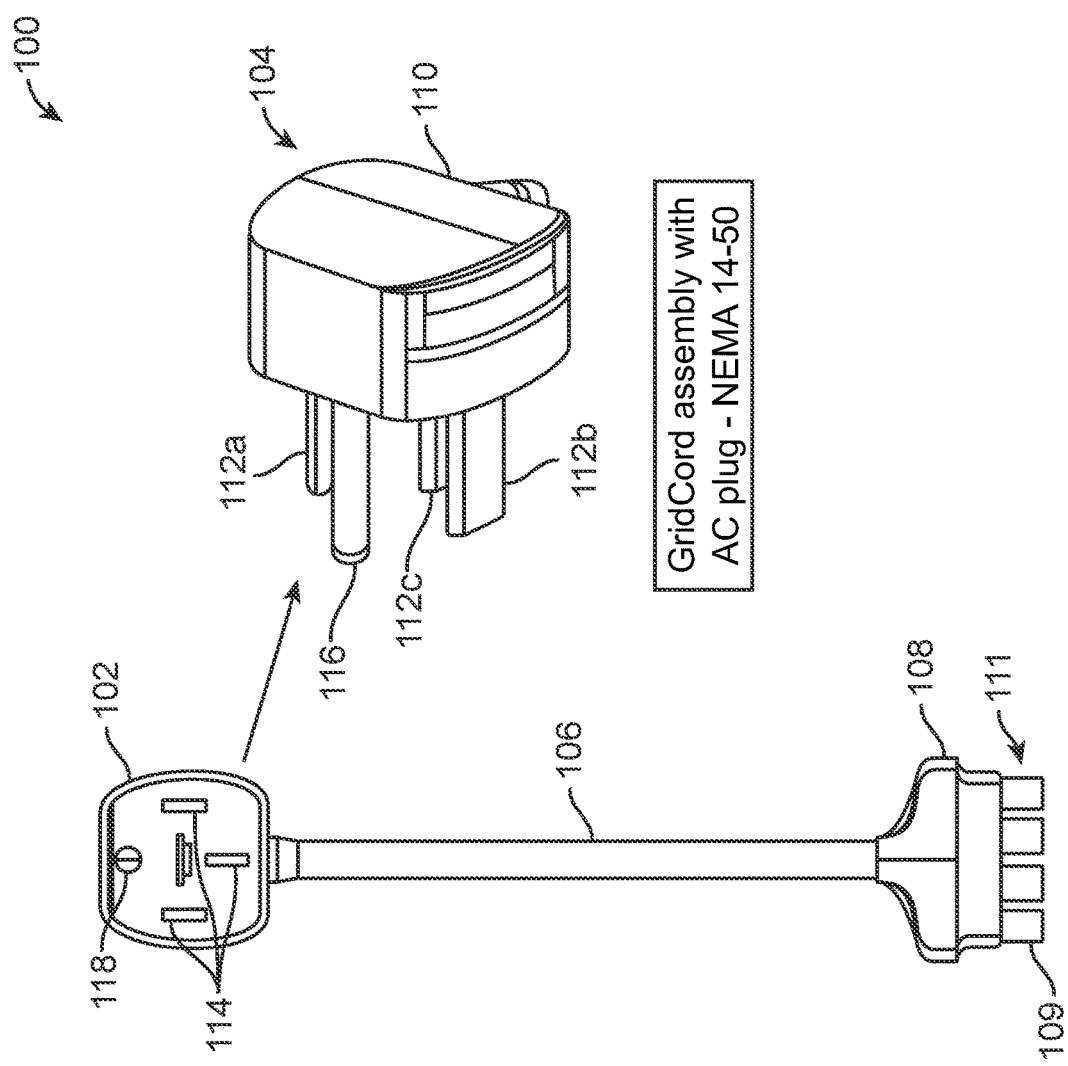
FIG. 1 depicts a system for AC plug temperature regulation for portable charging solutions.

With respect to FIG. 1, a system 100 for alternating current (AC) plug temperature regulation for portable charging solutions is illustrated. The system 100 includes an AC utility socket 102, an AC utility plug 104 with a housing 110, and a cable 106 with a cable leader 108. Generally speaking, AC plugs and sockets connect electric equipment to the alternating current (AC) power supply in buildings, electrical vehicles, and at other sites. Electrical plugs and sockets may differ from one another in voltage and current rating, shape, size, and connector type. In one embodiment, the AC plug 104 may be a NEMA 14-50 plug. The maximum current provided in the system may be 32 Amps in some embodiments. In other embodiments, the maximum current provided in the system may be 50 Amps. The AC plug 104 may have three blades 112a,b,c and a pin 116. The plug 104 may be connected to the socket 104 by inserting the blades 112a,b,c into socket blade receivers 114 and inserting the pin 116 into a socket pin receiver 118.

In one embodiment, the system 100 provides for detecting adverse conditions (e.g., high temperatures) in AC plug charging equipment, such as Electric Vehicle Supply Equipment (EVSE). Upon detection of an onset of an adverse condition, an action may be taken. For example, a reduction in voltage and/or current may be imposed to avoid an adverse condition. Examples of adverse conditions are, but not limited to, damage or destruction of a car battery, damage or destruction of the EVSE, fire occurrence at the AC plug 104, and the like.

Figure 2:
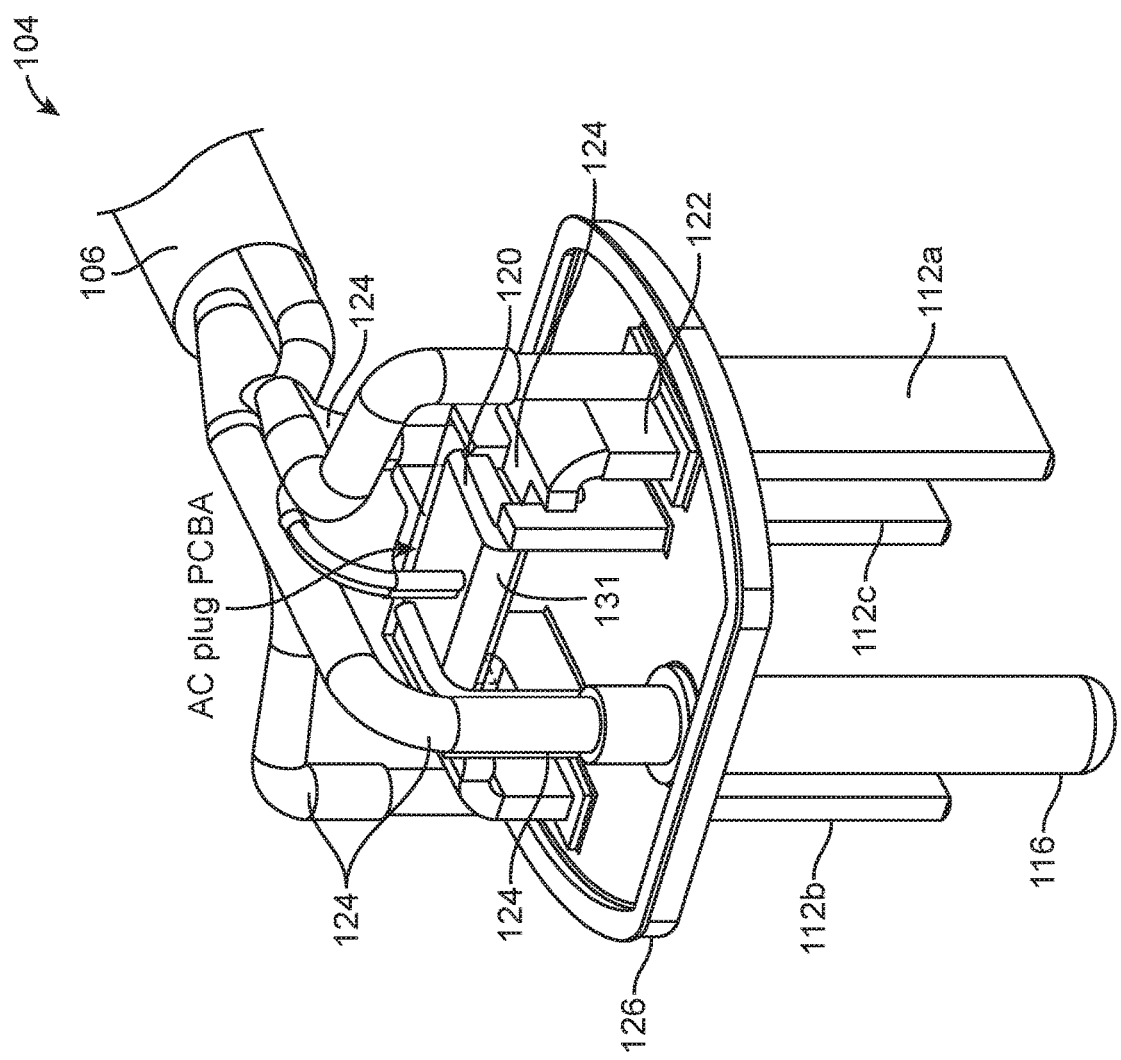
FIG. 2 depicts an AC plug of the system of FIG. 1.

With respect to FIG. 2, the AC plug 104 is illustrated with the housing 110 of FIG. 1 removed to reveal the inner components of the AC plug 104 in more detail. The three blades 112a,b,c and the pin 116 may each be connected to a wire 124, the wires 124 running through the cable 116 and to the cable leader 108 for supplying power, protective earth, and communication. In one embodiment, the wires 124 have a protective sheath, such as rubber or plastic. In one embodiment, the AC plug 104 may be potted and contain a soft overmold overtop the potting material.

In one embodiment, the plug 104 may have a printed circuit board assembly (PCBA) 120. The PCBA 120 may be connected to a pair of curved supports 122. The curved supports 122 may be associated with the blades 112a,b. The curved supports 122 may be attached to a base 126.

In one embodiment, a wall may extend from the perimeter of the base 126. In one embodiment, the wall allows for a push-fit attachment of the housing (110, FIG. 1) to the base 126. In one embodiment, each blade 112a,b and its accompanying curved support 122 may be secured in place with a latching mechanism.

More specifically, the base 126 is shown with the inner structure removed to highlight the latching mechanism. As each blade (112a,b,c, FIGS. 1-2) is inserted into an associated slot of the base 126, a pair of latches receive each respective blade and prevent each respective blade from further insertion. The latching mechanism may also have a root support mechanism to provide further structural support to the latching mechanism and support against over stress and even breakage of the latches. In one embodiment, the latching mechanism may have a central support structure to provide additional stiffness to the latching mechanism. In one embodiment, a substantial base support is disposed at the base of a pillar associated with each latch, where the latch is disposed at the top of the pillar. The base support provides additional support to the pillar to avoid stress concentration at the base of the pillar and possible breakage of the pillar. In one embodiment, the slot for receiving the blade 112c may have an additional support wall for the latching mechanism on the opposite side of the slot from the latching mechanism.

In one embodiment, the inner structure of the plug 104 may also have a support structure for the PCB (120, FIG. 2). The PCB may seat on a ledge of a pair of walls. The pair of walls may be supported by ribs, where the height of each rib runs perpendicular to the wall, providing support for the walls and keeping the walls from flexing inwards or outwards, or even breaking. Each wall may have an extension at one end of each wall extending the wall in height. The other end of each wall may taper inwardly toward a support pillar. Each support pillar may have an end portion.

Additionally, each support pillar end portion may be sized to fit just within an indentation of the PCB 120. The PCB 120 may be seated securely in the support structure with the end portion friction fit to the indentations of the PCB 120. The placement of the end portions in the indentations may help prohibit any side to side movement of the PCB 120. Furthermore, the support pillars with the end portions and the extensions of the walls sandwich the PCB 120 thus further securing the PCB in place.

Figure 3:
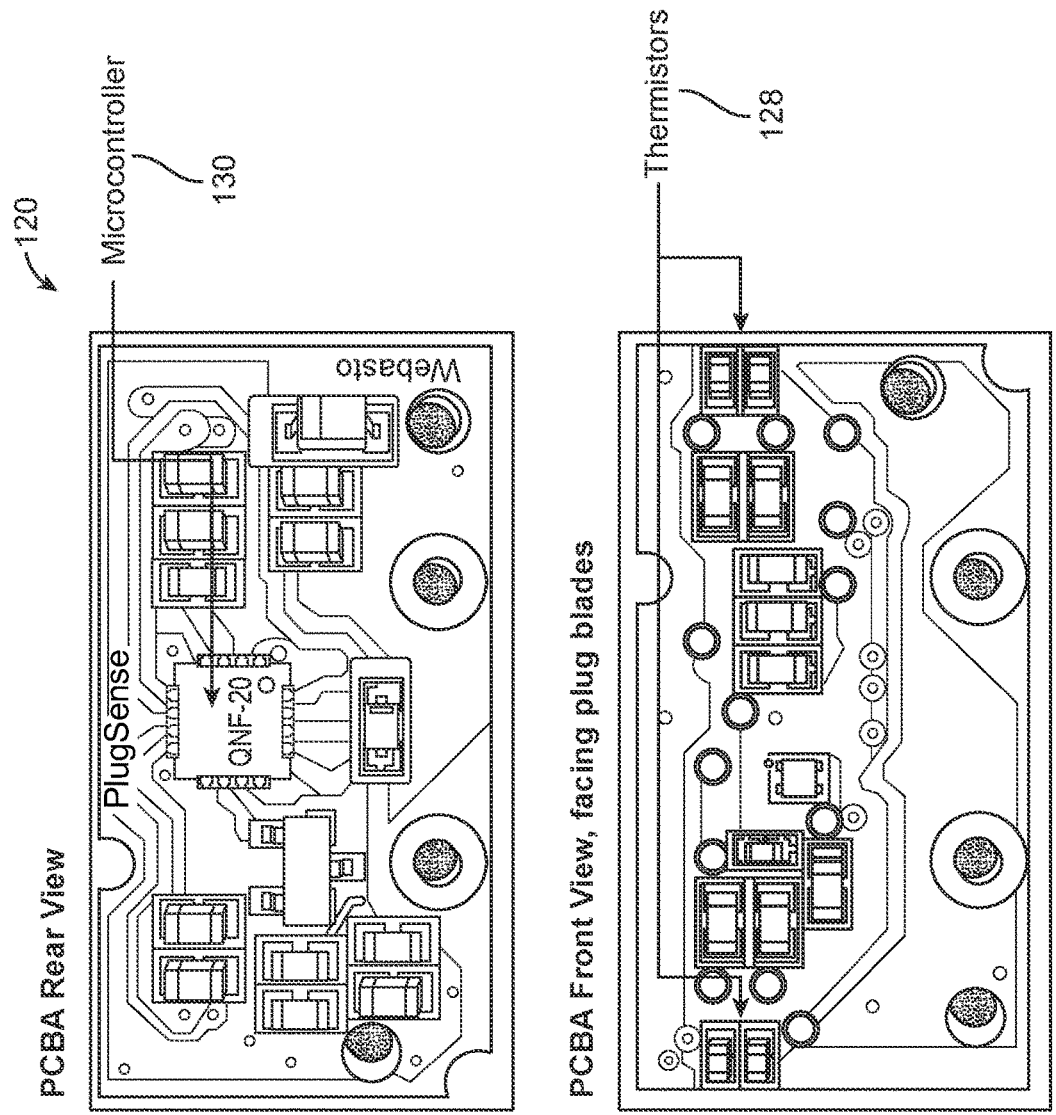
FIG. 3 depicts a printable circuit board assembly associated with the AC plug of FIG. 2
Figure 4:
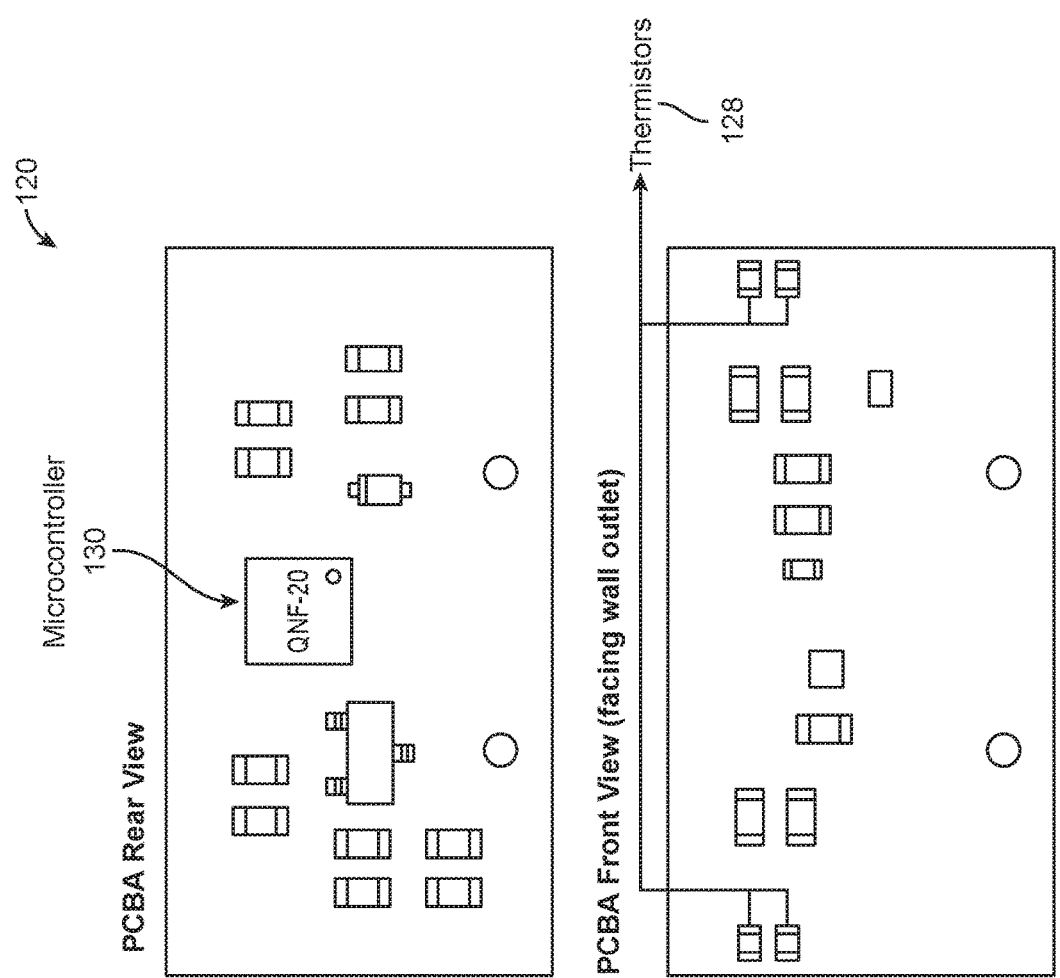
FIG. 4 depicts an alternative view of the printable circuit board assembly of FIG. 8.

With respect to FIG. 3, the front facing (or wall outlet facing) side of the PCBA 120 is shown in the bottom panel and includes 4 thermistors 128. The PCBA 120 may be seated in such a way that there is a minimum specified contact gap between the blades 112a,b,c and thermistors 128. In one embodiment, the minimum contact gap for electrical isolation is 1 mm. In one embodiment, the thermistors 128 are located near the outer edges of the PCBA 120 in order to be in close contact with the blades 112a,b. Additionally, the PCBA 120 may be encapsulated by an insulation jacket (131, FIG. 2) to prevent the PCBA 120 from becoming damaged during the potting process.

In one embodiment, the thermistors 128 may be electrical resistors whose resistance is significantly reduced by heating. Generally speaking, thermistors 128 are temperature sensors that may be used for temperature measurement and control. In one embodiment, the thermistors 128 are negative temperature coefficient (NTC) thermistors. With an NTC thermistor, resistance decreases as temperature rises. NTC thermistors are commonly used as a temperature sensor, or in series with a circuit as an inrush current limiter. In one embodiment, thermistors 128 are made of ceramic or polymer material, or a semiconducting material.

In one embodiment, the current passing through the AC plug 104 may be regulated based on temperature using two thermistors 128 per blade 112a,b. This regulated current may allow for redundancy in the event that one of the thermistors 128 is damaged or malfunctions, as will be discussed in further detail below. The regulated current may further allow for fault detection of the AC plug 104, such that if the two thermistors 128 per blade 112a,b register different temperature values, then one of the thermistors 128 is likely damaged. In one embodiment, upon detection of the different temperature values, the AC plug 104 may go into a lower power or "limp" mode, thus still providing some charge to a user.

Figure 5:
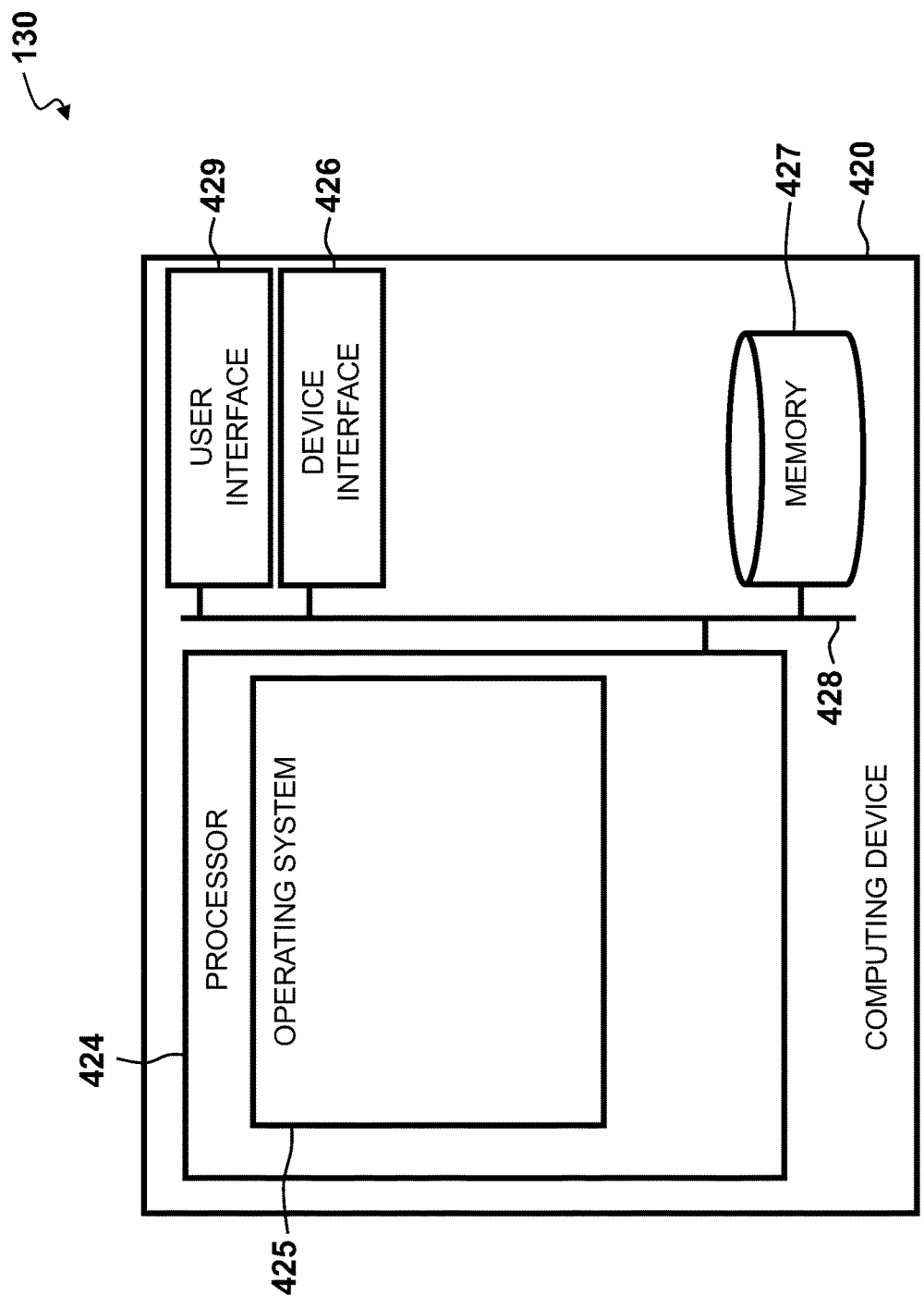
FIG. 5 shows a high-level diagram of a computing device associated with the AC plug of FIG. 2.

The rear facing side of the PCBA 120 is shown in the top panel of FIG. 3 and includes a microcontroller 130. With respect to FIG. 5, an example of a top-level functional block diagram of the microcontroller 130 is shown comprising a processor 424, such as a central processing unit (CPU), addressable memory 427, an external device interface 426, e.g., an optional universal serial bus port and related processing, and/or an Ethernet port and related processing, and an optional user interface 429, e.g., an array of status lights and one or more toggle switches, and/or a display, and/or a keyboard and/or a pointer-mouse system and/or a touch screen. Optionally, the addressable memory may, for example, be: flash memory, eprom, and/or a disk drive or other hard drive. These elements may be in communication with one another via a data bus 428. In some embodiments, the processor 424 may be configured to execute steps of a process to communicate temperature readings from the thermistors 128 to a second PCBA 132, as described below. In one embodiment, the form factor of the PCBA microcontroller 130 motherboard may provide for the single PCBA 120 to be integrated into a wide variety of plugs, such as a 20 Amp plug or a 50 Amp plug.

Figure 6:
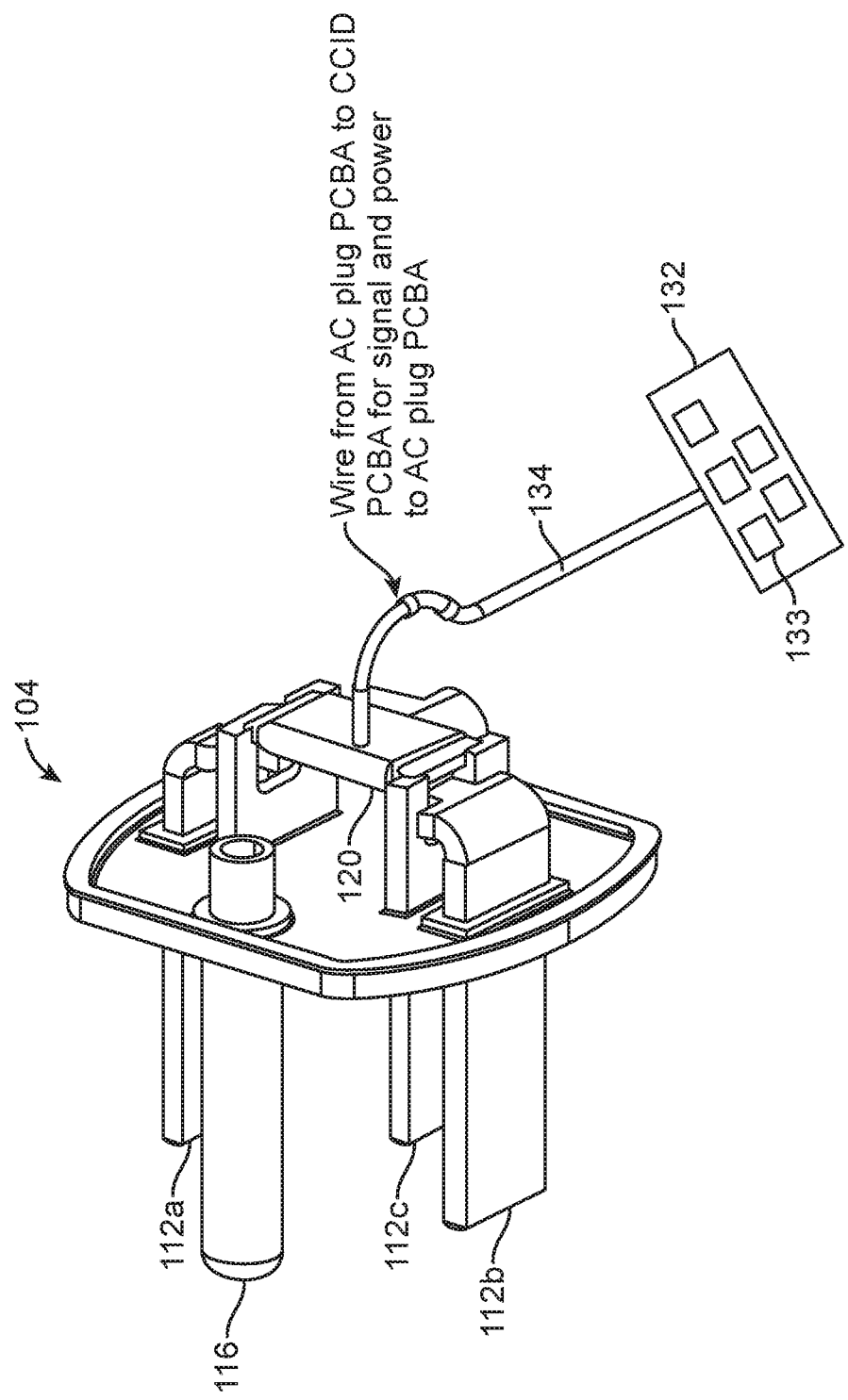
FIG. 6 depicts the AC plug of FIG. 2 connected to a second printable circuit board assembly.

With respect to FIG. 6, the current passing through the AC plug 104 may be regulated based on temperature using two thermistors 128 for blade 112a and two thermistors 128 for blade 112b. The temperature may be communicated with the processor 424 to the PCBA 132. In one embodiment, the PCBA 132 is a charge circuit interrupting device (CCID) via a wire 134 partially housed in the cable 106 (see FIG. 1). The wire 134 may be connected from the AC plug PCBA 120 to the second PCBA 132 and may be configured to function both as a signal and a power line for the AC plug PCBA 120. With respect to FIG. 1, the cable leader 108 of the cable 106 includes an interface 111 to the CCID PCBA 132. The interface 111 may include a plurality of pins 109. In one embodiment, the interface 111 may have four pins 109. In one embodiment, one of the pins 109 may provide for communication and power to the PCBA 132. More specifically, the PCBA 120 transmits power and communication via the wire 134 to a pin 109 of the interface 111 and on to the PCBA 132.

The PCBA 132 may be a standard USB protocol that allows a smartcard to be connected to a computer via a card reader using a standard USB interface, without the need for each manufacturer of smartcards to provide its own reader or protocol. The PCBA 132 may determine the current allowed based on a temperature regulation algorithm, and the difference in temperature between the two thermistors 128 on the two blades 112a,b may be used to determine faults/malfunctions between the thermistors 128. The PCBA 132 may have a plurality of sensors 133. In one embodiment, sensors 133 include: an ambient/PCBA temperature sensor, two relay temperature sensors, and two input temperature sensors.

At detected high temperatures, a reduction in voltage and/or current is desired in order to avoid an adverse condition. Generally speaking, de-rating of an electronic system, such as system 100 of FIG. 1 is the operation of that system at less than the system's rated maximum capacity in order to prolong the lifetime of the device, such as operation below the maximum current rating. More specifically, "foldback" is a de-rating current limiting feature (e.g., a form of temperature-based current regulation) of power supplies and power amplifiers for such temperature fault handling. In the event that a load attempts to draw overcurrent from the supply, foldback may reduce both the output voltage and current to values well below the normal operating limits. Foldback may provide for maintaining current output within a safe operating range without having to terminate the current entirely. Foldback may also significantly reduces the power dissipation in the load in fault conditions, which may reduce the risks of fire and heat damage.

Figure 7:
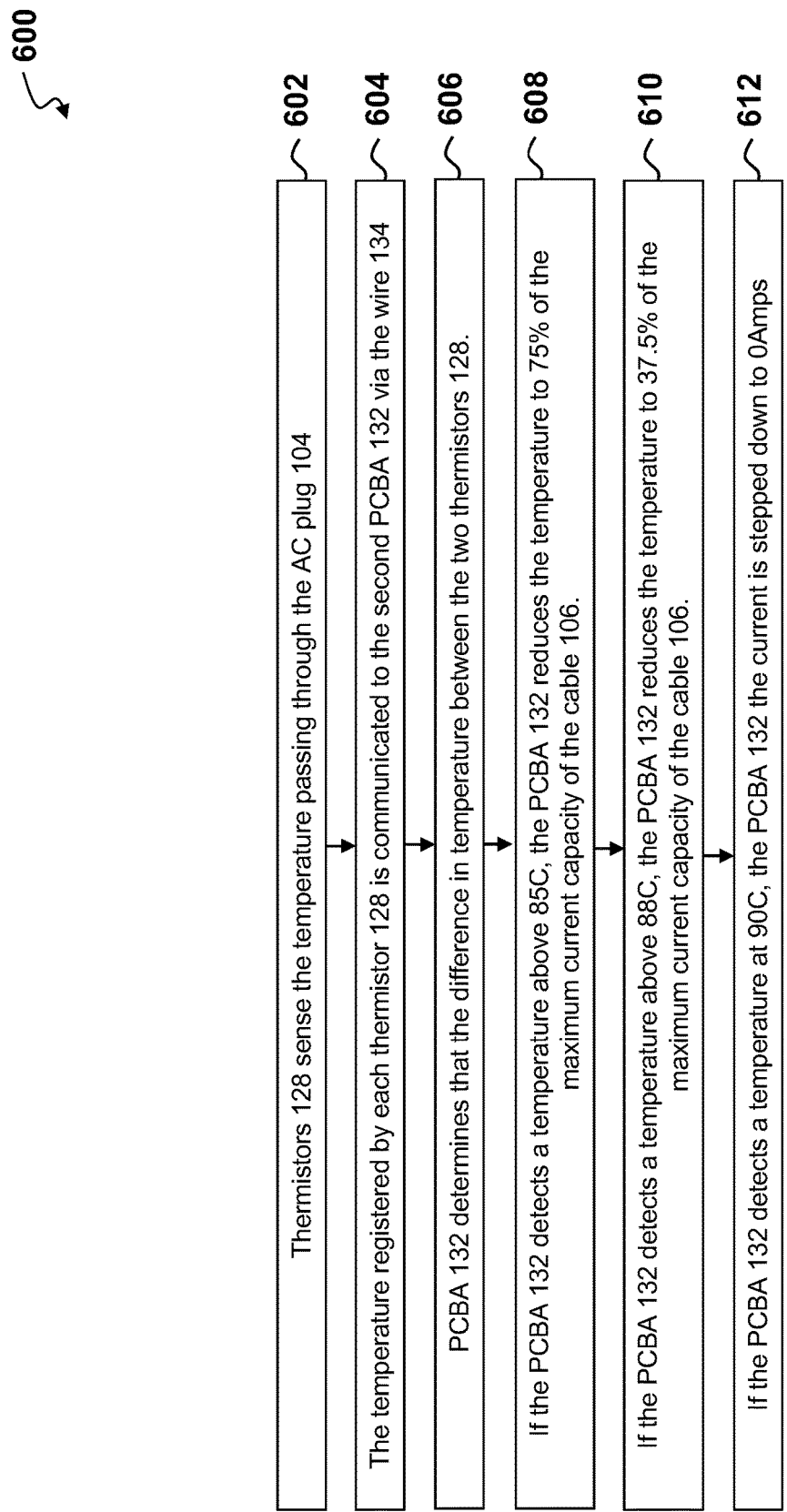
FIG. 7 shows a flow chart of a process for AC plug temperature regulation for portable charging solutions.

With respect to FIG. 7, a stepped foldback de-rating method 600 is applied for detecting and resolving adverse conditions in an AC plug system, such as AC plug system 100 is illustrated. At step 602, thermistors 128 sense the temperature passing through the AC plug 104. At step 604, the temperature registered by each thermistor 128 is communicated to the PCBA 132 via the wire 134. At step 606, the PCBA 132 may determine that the difference in temperature between the two thermistors 128 on the two blades 112a,b may correspond to a current that exceeds an optimal threshold. At step 608, if the PCBA 132 detects a temperature above 85 C, the PCBA 132 reduces the temperature to 75% of the maximum current capacity of the cable 106. At step 610, if the PCBA 132 detects a temperature above 88 C, the PCBA 132 reduces the temperature to 37.5% of the maximum current. At step 610, if the PCBA 132 detects a temperature at 90 C, the PCBA 132 reduces the current is stepped down to 0 Amps.

Figure 8:
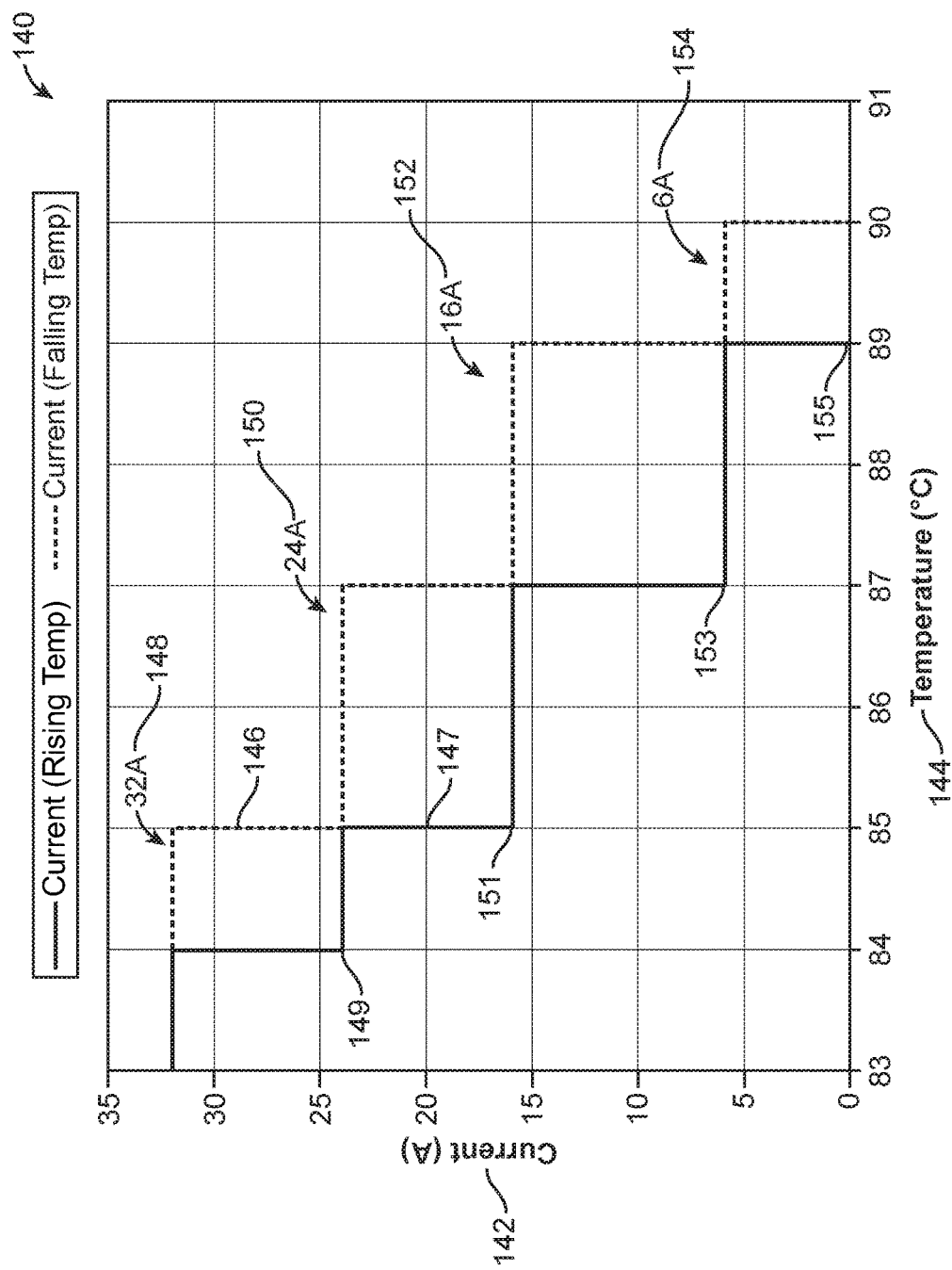
FIG. 8 shows a graph of an embodiment associated with the process of FIG. 7.

With respect to FIG. 8, a graph 140 shows an example of temperature fault handling with the stepped foldback de-rating method 600 for a system, such as system 100 of FIG. 1. In this example, the system may handle a maximum current capacity of the cable 106 rated between 32 Amps and 17 Amps. Graph 140 depicts the current measured in Amps on a y-axis 142 versus the temperature measured in degrees C. on an x-axis 144. A first curve 146 depicts how the current of the system is dropped down when a given temperature threshold is exceeded. A second curve 147 depicts how the current of the system is increased when the temperature of the system decreases back down below a given temperature threshold. For example, if the PCBA 132 detects a temperature greater than or equal to 85 C, the PCBA 132 steps the current down to 24 Amps from 32 Amps, as shown at a point 148 on the curve 146. If the PCBA 132 detects that the temperature of the system has then dropped to less than or equal to 84 C, the PCBA 132 steps the current back up to the maximum allowed 32 Amps, as shown at a point 149 on the curve 147. If the PCBA 132 detects that the temperature continues to rise to a temperature greater than or equal to 87 C, the PCBA 132 steps the current down to 16 Amp from 24 Amps, as shown at a point 150 on the curve 146. If the PCBA 132 detects that the temperature of the system has dropped to less than or equal to 85 C, the PCBA 132 steps the current back up to 24 Amps from 16 Amps, as shown at a point 151 on the curve 147. If the PCBA 132 detects that the temperature continues to rise to a temperature greater than or equal to 89 C, the PCBA 132 steps the current down to 6 Amps from 16 Amps, as shown at a point 152 on the curve 146. If the PCBA 132 detects that the temperature of the system has dropped to less than or equal to 89 C, the PCBA 132 steps the current back up to 16 Amps from 6 Amps, as shown at a point 153 on the curve 147. If the PCBA 132 detects that the temperature continues to rise to a temperature greater than or equal to 90 C, the PCBA 132 steps the current down to 0 Amps from 6 Amps, as shown at a point 154 on the curve 146. If the PCBA 132 detects that the temperature of the system has dropped to less than or equal to 89 C, the PCBA 132 steps the current back up to 6 Amps from 0 Amps, as shown at a point 155 on the curve 147.

Figure 9:
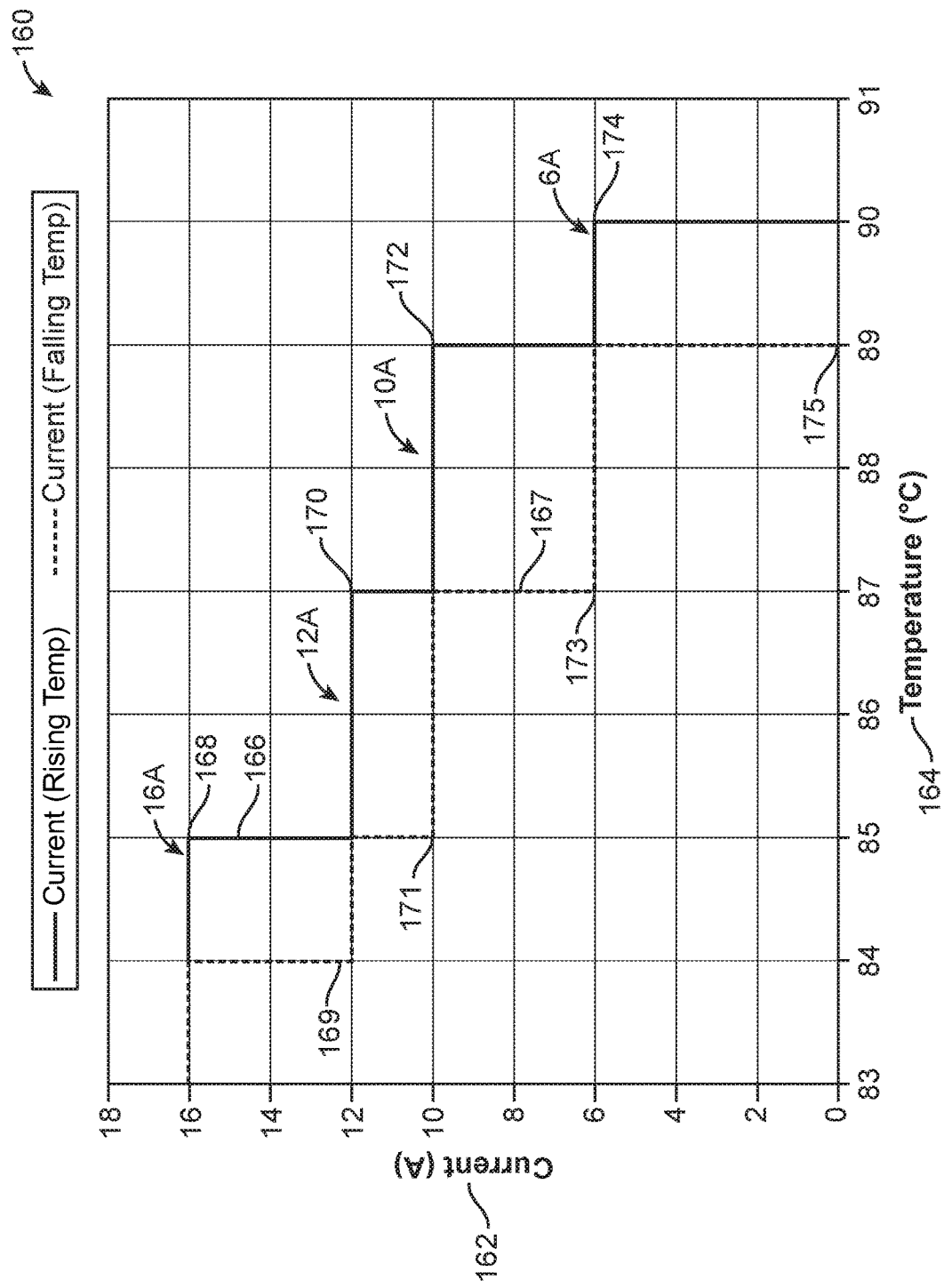
FIG. 9 shows a graph of an alternative embodiment associated with the process of FIG. 7.

With respect to FIG. 9, a graph 160 shows an alternative example of temperature fault handling with the stepped foldback de-rating method 600 for a system, such as system 100 of FIG. 1. In this example, the system may handle a maximum current capacity of the cable 106 rated up to 16 Amps. Graph 160 depicts the current measured in Amps on a y-axis 162 versus the temperature measured in degrees C. on an x-axis 164. A first curve 166 depicts how the current of the system is dropped down when a given temperature threshold is exceeded. A second curve 167 depicts how the current of the system is increased when the temperature of the system decreases back down below a given temperature threshold. For example, if the PCBA 132 detects a temperature greater than or equal to 85 C, the PCBA 132 steps the current down to 12 Amps from 16 Amps, as shown at a point 168 on the curve 166. If the PCBA 132 detects that the temperature of the system has dropped to less than or equal to 84 C, the PCBA 132 steps the current back up to the maximum allowed 16 Amps from 12 Amps, as shown at a point 169 on the curve 167. If the PCBA 132 detects that the temperature continues to rise to a temperature greater than or equal to 87 C, the PCBA 132 steps the current down to 10 Amps from 12 Amps, as shown at a point 170 on the curve 146. If the PCBA 132 detects that the temperature of the system has dropped to less than or equal to 85 C, the PCBA 132 steps the current back up to 12 Amps from 10 Amps, as shown at a point 171 on the curve 167. If the PCBA 132 detects that the temperature continues to rise to a temperature greater than or equal to 89 C, the PCBA 132 steps the current down to 6 Amps from 10 Amps, as shown at a point 172 on the curve 166. If the PCBA 132 detects that the temperature of the system has dropped to less than or equal to 89 C, the PCBA 132 steps the current back up to 10 Amps from 6 Amps, as shown at a point 173 on the curve 167. If the PCBA 132 detects that the temperature continues to rise to a temperature greater than or equal to 90 C, the PCBA 132 steps the current down to 0 Amps from 6 Amps, as shown at a point 174 on the curve 166. If the PCBA 132 detects that the temperature of the system has dropped to less than or equal to 89 C, the PCBA 132 steps the current back up to 6 Amps from 0 Amps, as shown at a point 175 on the curve 167.

Figure 10:
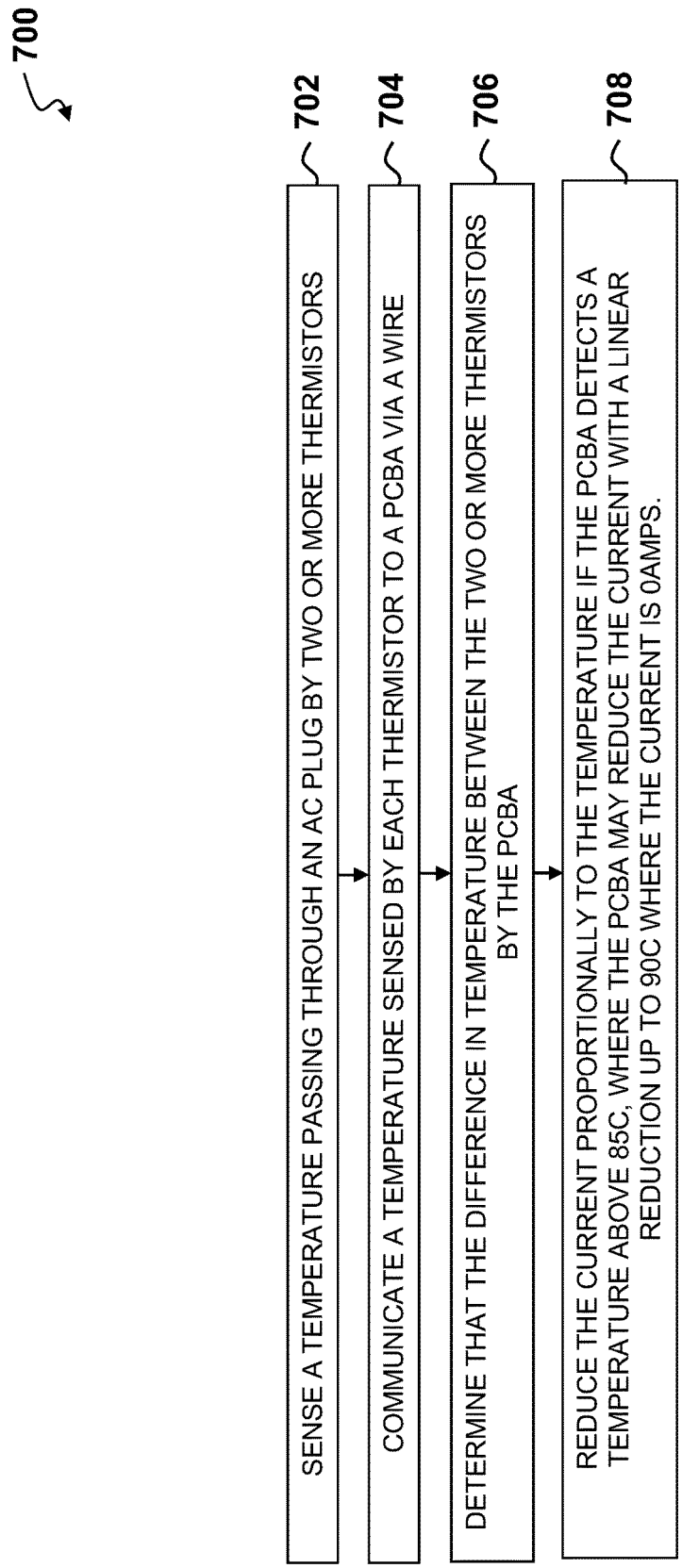
FIG. 10 shows a flow chart of an alternative process for AC plug temperature regulation for portable charging solutions.

With respect to FIG. 10, a linear foldback de-rating method 700 is applied for detecting and resolving adverse conditions in an AC plug system, such as AC plug system 100 is illustrated. At step 702, thermistors 128 sense the temperature passing through the AC plug 104. At step 704, the temperature registered by each thermistor 128 is communicated to the PCBA 132 via the wire 134. At step 706, the PCBA 132 may determine that the difference in temperature between the two thermistors 128 on the two blades 112*a,b* may correspond to a current that exceeds an optimal threshold. At step 708, if the PCBA 132 detects a temperature above 85 C, the PCBA 132 may reduce the current proportionally to the temperature with a linear reduction up to 90 C where the current is 0 Amps.

Figure 11:
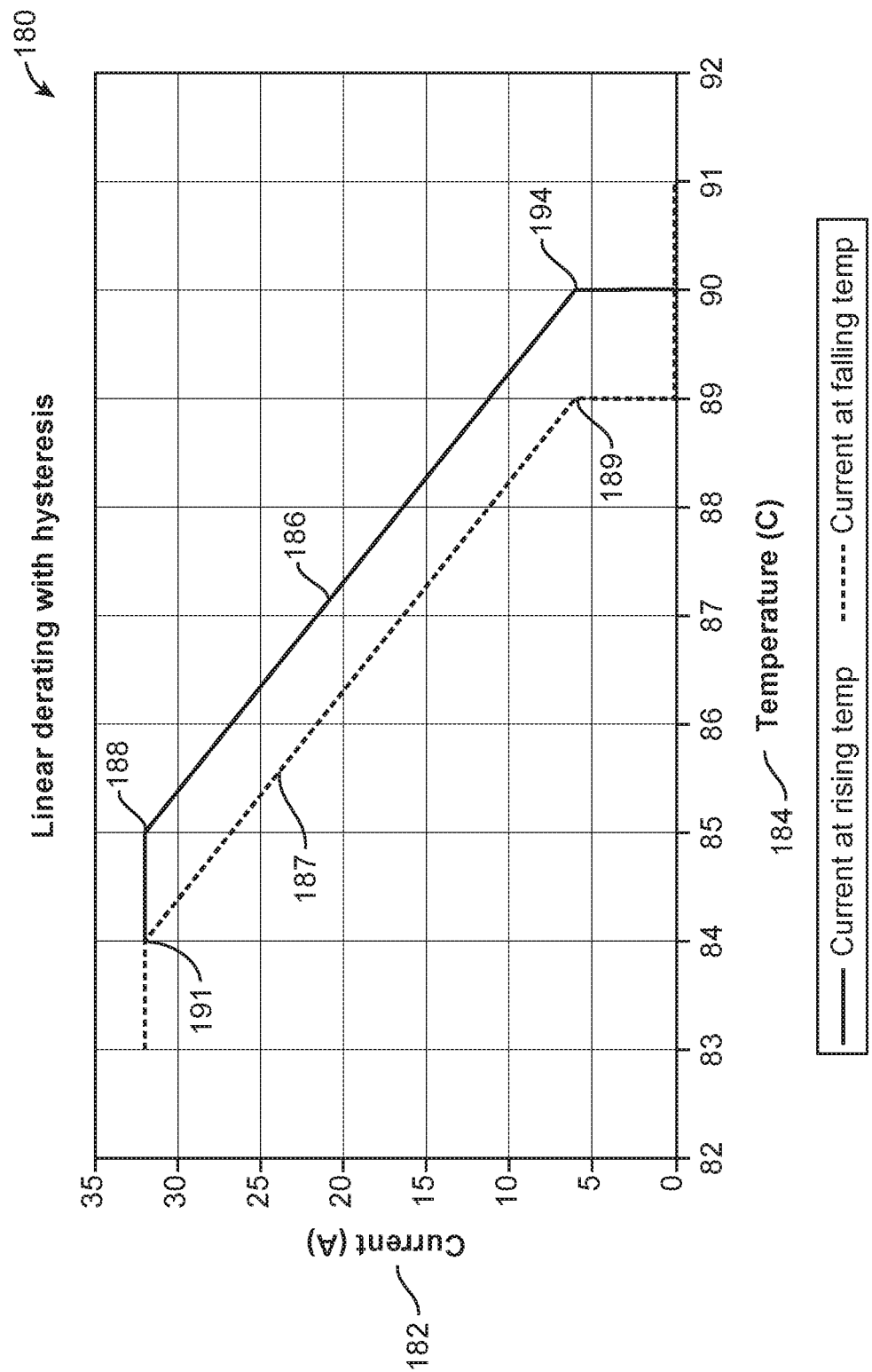
FIG. 11 shows a graph of an embodiment associated with the process of FIG. 15.

With respect to FIG. 11, a graph 180 shows an alternative example of temperature fault handling with the linear foldback de-rating method 700 for a system, such as system 100 of FIG. 1. In this example, the system may handle a maximum current capacity of the cable 106 rated up to 32 Amps. Graph 180 depicts the current measured in Amps on a y-axis 182 versus the temperature measured in degrees C. on an x-axis 184. A first curve 186 depicts how the current of the system is linearly decreased when a given temperature threshold is exceeded. If the PCBA 132 detects a temperature above 85 C at a point 188, the PCBA 132 may reduce the current proportionally to the temperature with a linear reduction down to a current of 6 Amps and a temperature up to 90 C at a point 194. If the temperature exceeds 90 C, the current is dropped to 0 Amps. A second curve 187 depicts how the current of the system is linearly increased when the temperature drops below a given temperature threshold. If the PCBA 132 detects a temperature below or at 90 C at a point 189, the PCBA 132 may increase the current from 6 Amps (at a point 189) proportionally to the temperature, with a linear increase to a current of 32 Amps and a temperature down to 84 C at a point 191. If the temperature exceeds 90 C, the current is 0 Amps.

In one embodiment, and with respect to the methods described above, temperature fault handling either by stepped foldback de-rating method 600 or linear foldback de-rating method 700 may commence when any of the temperature sensors, such as thermistors 128 of PCBA 120 and sensors 133 of PCBA 132 sense a temperature of 90 C or above. In another embodiment, temperature fault handling may begin when any of the sensors 133 is missing and/or any of the thermistors 128 is missing. In another embodiment, temperature fault handling may begin when the temperature difference between the thermistors 128 on the two blades 112*a,b* exceeds 12 C.

In one embodiment, the system 100 may recover from a temperature fault when all temperature sensors (e.g., thermistors 128 and sensors 133) detect a temperature below 90 C. After the recovery, the current de-rate logic may control the maximum current allowed. In one embodiment, a maximum of 3 temperature fault recoveries may occur during a power session, after which the recovery may occur manually.

Figure 12:
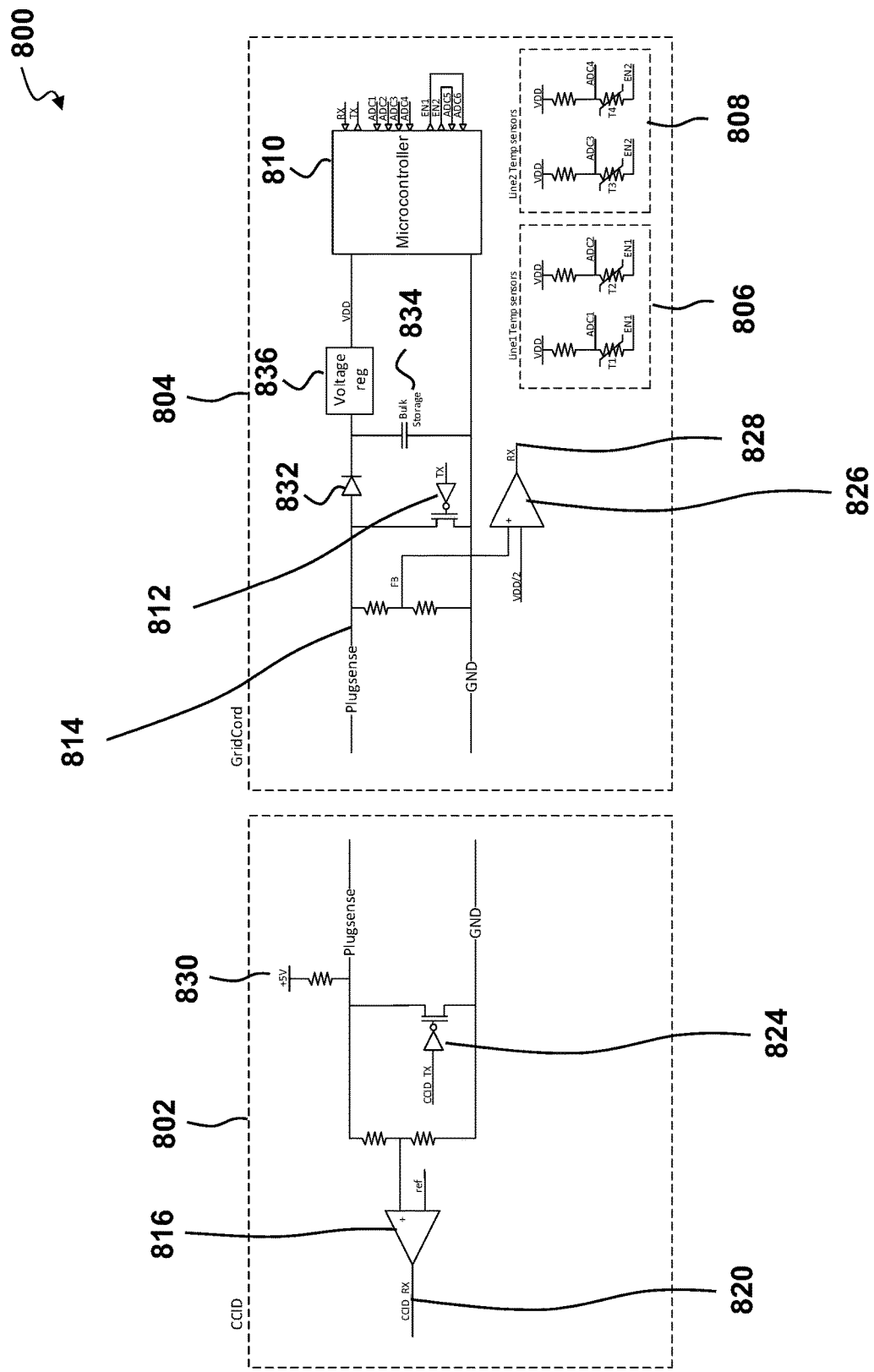
FIG. 12 shows a block diagram of one embodiment of a system for AC plug temperature regulation for portable charging solutions.

FIG. 12 shows a block diagram of one embodiment of a system 800 for AC plug temperature regulation for portable charging solutions. The gridcord 804 includes components in a plug that is attached to a power source, such as a power outlet in a wall. The gridcord 804 is in communication with and supplies power to the charge circuit interrupting device (CCID) 802. The CCID 802 is in the electric vehicle charging supply equipment that supplies power to an electric vehicle.

The gridcord 804 includes redundant temperature sensors for the line 1 plug blade 806 and redundant temperature sensors for the line 2 plug blade 808. Each contact includes two temperature sensors. Redundant sensors allow for the detection of an open or stuck temperature sensors. Readings from each of the redundant temperature sensors can be compared to one another to confirm whether each sensor reports the same, or a similar, value. If the values are not the same, or similar, then the system may determine a fault in one of the temperature sensors. T1, T2, T3, T4 are shown as the temperature sensors. A voltage divider from these temperature sensors is output as ADC1, ADC2, ADC3, and ADC4 and received by the microcontroller 810.

Input/output (IO) pins enable 1 (EN1) and enable 2 (EN2) may be enabled and/or disabled by the microcontroller 810 to determine whether the temperature sensors T1, T2, T3, T4 are operating correctly and are not stuck or open circuits. EN1 and EN2 may be set to 0V or ground and the sensors T1, T2, T3, T4 are enabled. EN1 and EN2 may be set to 3.3V or high and the sensors T1, T2, T3, T4 are disabled.

In some embodiments, the microcontroller 810 operates over serial communication with a receive line RX and a transmit line TX. The transmit line may be connected to a metal-oxide-semiconductor field-effect transistor (MOSFET) 812. In some embodiments, the MOSFET 812 may be any switching device receiving an output from the microcontroller 810. In some embodiments the MOSFET 812 may be a bipolar junction transistor (BJT). When the MOSFET is turned on it pulls down the plugsense line 814 voltage. A comparator 816 in the CCID 802 detects the voltage drop on the plugsense line 814. When the voltage drop is detected by the comparator 816, the comparator 816 sends a signal one a receive line of the CCID CCID_RX 820, which may be received by a microcontroller of the CCID.

The microcontroller of the CCID may transmit a signal via the CCID_TX line to a CCID MOSFET 824 or other switch. In some embodiments the CCID MOSFET 824 may be a bipolar junction transistor (BJT). The transmitted signal may be detected by a comparator 826 of the gridcord 804 and a corresponding receive RX signal 828 may be sent to the microcontroller 810 of the gridcord 804.

When no transmissions are occurring, the plugsense line 814 may be pulled high via a power source 830, which supplies power to the gridcord 804. Power from the power source 830 passes through diode 832 and charges a bulk storage 834, which may be a capacitor, up to 5V. A voltage regulator 836 regulates the voltage from 5V down to what voltage is required by the microcontroller 810, such as 3.3V. When not communicating, the microcontroller 810 receives power from the power source 830. When communicating, communication is done in very short bursts and power to the microcontroller 810 is provided via the bulk storage capacitor 834.

The microcontroller of the CCID 802 sends a status signal to the microcontroller 810 of the gridcord 804. In response to the status signal, the microcontroller 810 of the gridcord transmits a temperature back to the microcontroller of the CCID 802. In one embodiment, the microcontroller 810 of the gridcord 804 may transmit four temperature readings corresponding to the four temperature sensors. T1, T2, T3, T4. The microcontroller of the CCID 802 may determine if the temperature readings are valid, e.g., that a temperature controller is not stuck in an open position. If the temperature readings are over a first set threshold, such as 90 C, then the charging current may be reduced. If the temperature readings are over a second set threshold, then the charging may be stopped. In some embodiments, temperature readings may be checked once per second. Other timing is possible and contemplated.

Figure 13:
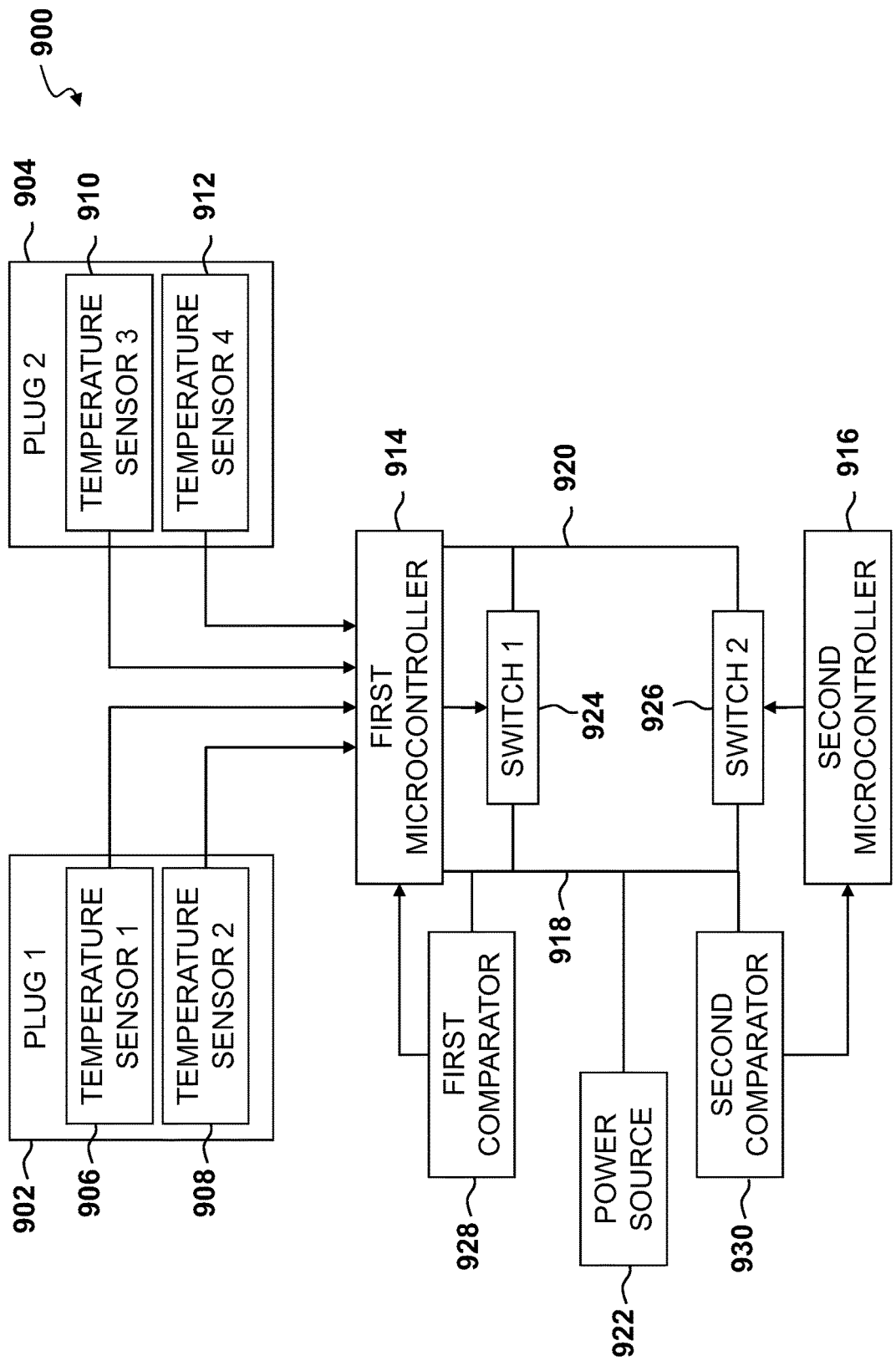
FIG. 13 shows a high-level functional block diagram of a system for AC plug temperature regulation for portable charging solutions.

FIG. 13 shows a high-level functional block diagram of a system 900 for AC plug temperature regulation for portable charging solutions. The system may include redundant first and second temperature sensors 906, 908 proximate a first plug 902 and redundant third and fourth temperature sensors 910, 912 proximate a second plug 904. A first microcontroller 914 may receive a temperature reading from the first temperature sensor 906, the second temperature sensor 908, the third temperature sensor 910, and the fourth temperature sensor 912. In some embodiments, the first microcontroller 914 may be disposed in a gridcord (See FIG. 12), such as a plug that is connected to a power such, such as an outlet in a wall.

The first microcontroller 914 may be connected to a plugsense line 918 and a ground line 920. The first microcontroller 914 may receive power from a power source 922 such as a 5V power source. In some embodiments, the first microcontroller 914 may receive power via a voltage regulator, such as a voltage regulator that converts 5V from the power source 922 to 3.3V required by the microcontroller. In some embodiments, the first microcontroller 914 may receive power from a power storage, such as a capacitor that is charged by the power source 922.

The second microcontroller 916 may be disposed proximate a charge circuit interrupting device (CCID). The second microcontroller may send a status signal to a second switch 926. The status signal may be a request for the temperature readings of the four temperature sensors 906, 908, 910, 912. The second switch 926 may turn on and off to transmit a binary signal. As the second switch 926 is turned on, the voltage level at the plugsense line 918 is lowered.

The first comparator 928 detects the changes in the voltage level of the plugsense line 918 and outputs a signal that is received by the first microcontroller 914. The first microcontroller 914 receives the status signal from the second microcontroller 916 via the detected voltage changes in the plugsense line 918 by the first comparator 928.

In response to the received status signal, the first microcontroller sends a data packet to a first switch 924. The data packet may be a binary data packet in some embodiments. The data packet is transmitted by turning the first switch 924 on and off. As the first switch 924 is turned on, the voltage level at the plugsense line 918 is lowered.

The second comparator 930 detects the changes in the voltage level of the plugsense line 918 and outputs a signal that is received by the second microcontroller 916. The second microcontroller 916 receives the data packet from the first microcontroller 914 via the detected voltage changes in the plugsense line 918 by the second comparator 930. The second microcontroller 916 determines if the data packet containing temperature readings from the four temperature sensors 906, 908, 910, 912 contains a reading from a temperature sensor that is stuck open. The second microcontroller 916 may determine that a temperature sensor is stuck open or not operating correctly if the other sensor of the redundant sensor pair has a very different temperature reading. The second microcontroller 916 may then determine if the temperature readings are above a set threshold. In one embodiment, the set threshold may be 90 degrees Celsius. If the temperature readings exceed the set threshold, then the second microcontroller 916 may reduce a charging current.

In some embodiments, the data packet may be a binary data packet containing temperature data. In some embodiments, the system 900 may use a serial communication protocol, such as RS-232. In some embodiments, the first switch 924 and the second switch 926 may be a metal-oxide-semiconductor field-effect transistor (MOSFET). In other embodiments, the first switch 924 and the second switch 926 may be any switching device receiving an output from the first microcontroller 914 and the second microcontroller 916, respectively. In other embodiments, the first switch 924 and the second switch 926 may be a bipolar junction transistor (BJT).

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
   a first pair of redundant temperature sensors proximate a first plug;
   a second pair of redundant temperature sensors proximate a second plug;
   a first microcontroller connected to a plugsense line and a ground line, wherein the first microcontroller is configured to receive temperature data from the first pair of redundant temperature sensors and the second pair of redundant temperature sensors; and
   a first switch configured to receive a data packet comprising temperature data from the first pair of redundant temperature sensors and the second pair of redundant temperature sensors, wherein the first switch transmits the data packet by lowering voltage in the plugsense line.

2. The system of claim 1, further comprising:
   a second microcontroller configured to generate a status signal.

3. The system of claim 2, further comprising:
   a second switch configured to receive the status signal from the second microcontroller.

4. The system of claim 3, further comprising:
   a first comparator connected to the plugsense line, wherein the first comparator is configured to detect the status signal from the second switch as the voltage in the plugsense line is lowered.

5. The system of claim 4, wherein the first comparator is further configured to transmit the signal to the first microcontroller.

6. The system of claim 5, further comprising:
   a second comparator connected to the plugsense line, wherein the second comparator is configured to detect the data packet from the first switch as the voltage in the plugsense line is lowered.

7. The system of claim 6, wherein the second comparator is further configured to transmit the signal to the second microcontroller.

8. The system of claim 7, wherein the second microcontroller is further configured to determine if any temperature sensor of the first pair of redundant temperature sensors and the second pair of redundant temperature sensors is stuck or open.

9. The system of claim 7, wherein the second microcontroller is further configured to reduce a charging current if the temperature in the data packet exceeds a threshold.

10. The system of claim 6, further comprising a gridcord and a charge circuit interrupting device (CCID), wherein the first pair of redundant temperature sensors, the second pair of redundant temperature sensors, the first microcontroller, the first switch, and the first comparator are disposed in the gridcord, and wherein the second switch and the second comparator are disposed in the CCID.

11. A method comprising:
    receiving, by a first microcontroller connected to a plugsense line and a ground line, temperature data from a first pair of redundant temperature sensors and a second pair of redundant temperature sensors, wherein the first pair of redundant temperature sensors are proximate a first plug, and wherein the second pair of redundant temperature sensors are proximate a second plug;
    transmitting, by the first microcontroller, a data packet comprising temperature data from the first pair of redundant temperature sensors and the second pair of redundant temperature sensors to a first switch; and
    transmitting, by the first switch, the received data packet by lowering voltage in the plugsense line.

12. The method of claim 11, further comprising:
    generating, by a second microcontroller, a status signal.

13. The method of claim 12, further comprising:
    receiving, by a second switch, the generated status signal from the second microcontroller.

14. The method of claim 13, further comprising:
    detecting, by a first comparator connected to the plugsense line, the status signal from the second switch as the voltage in the plugsense line is lowered.

15. The method of claim 14, further comprising:
    transmitting, by the first comparator, the detected signal to the first microcontroller.

16. The method of claim 15, further comprising:
    detecting, by a second comparator connected to the plugsense line, the data packet from the first switch as the voltage in the plugsense line is lowered.

17. The method of claim 16, further comprising:
    transmitting, by the second comparator, the detected signal to the second microcontroller.

18. The method of claim 17, further comprising:
    determining, by the second microcontroller, if any temperature sensor of the first pair of redundant temperature sensors and the second pair of redundant temperature sensors is stuck or open.

19. The method of claim 17, further comprising:
    reducing, by the second microcontroller, a charging current if the temperature in the data packet exceeds a threshold.

20. A system comprising:
    a first pair of redundant temperature sensors proximate a first plug;
    a second pair of redundant temperature sensors proximate a second plug;
    a first microcontroller connected to a plugsense line and a ground line, wherein the first microcontroller is configured to receive temperature data from the first pair of redundant temperature sensors and the second pair of redundant temperature sensors;

a first switch configured to receive a data packet comprising temperature data from the first pair of redundant temperature sensors and the second pair of redundant temperature sensors, wherein the first switch transmits the data packet by lowering voltage in the plugsense line;

a second microcontroller configured to generate a status signal;

a second switch configured to receive the status signal from the second microcontroller;

a first comparator connected to the plugsense line, wherein the first comparator is configured to detect the status signal from the second switch as the voltage in the plugsense line is lowered, wherein the first comparator is further configured to transmit the signal to the first microcontroller;

a second comparator connected to the plugsense line, wherein the second comparator is configured to detect the data packet from the first switch as the voltage in the plugsense line is lowered, wherein the second comparator is further configured to transmit the signal to the second microcontroller, wherein the second microcontroller is further configured to determine if any temperature sensor of the first pair of redundant temperature sensors and the second pair of redundant temperature sensors is stuck or open, wherein the second microcontroller is further configured to reduce a charging current if the temperature in the data packet exceeds a threshold.

* * * * *